Oct. 8, 1940.  A. M. WENGEL  2,217,394
METHOD AND APPARATUS FOR TESTING HEARING
Filed Feb. 6, 1939  2 Sheets-Sheet 1
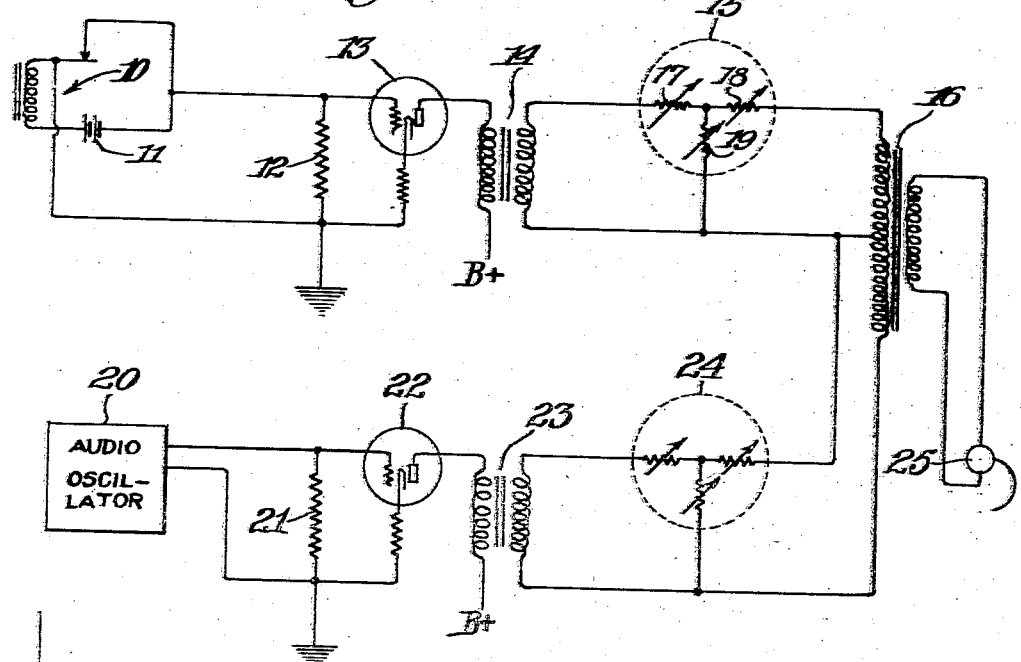
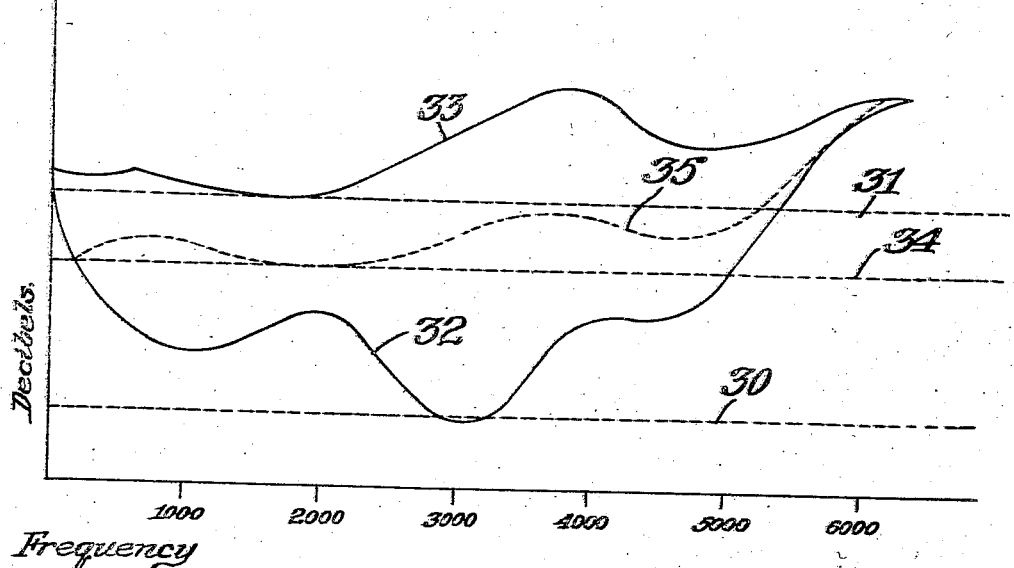
Inventor:
Arthur M. Wengel,
By Critton, Wiles, Davies, Hirschl & Dawson,
Attys.

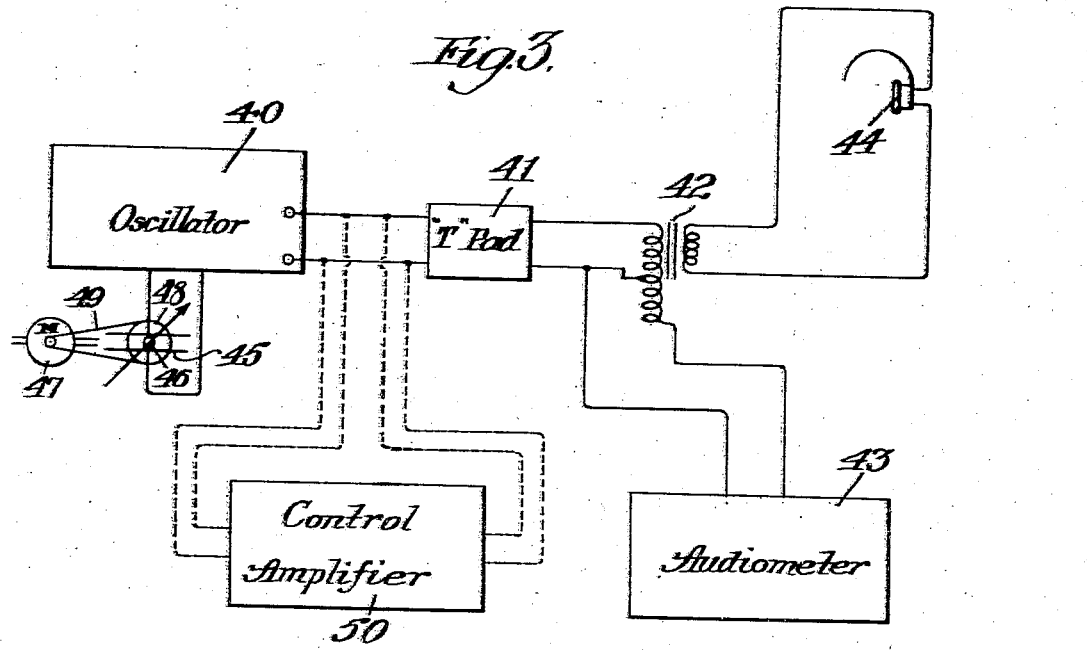

UNITED STATES PATENT OFFICE 2,217,394

METHOD AND APPARATUS FOR TESTING HEARING

Arthur M. Wengel, Madison, Wis., assignor to Ray-O-Vac Company, a corporation of Wisconsin Application February 6, 1939, Serial No. 254,931

7 Claims. (Cl. 179—1)

This invention relates to a method and apparatus for testing hearing, particularly adapted to enable optimum design of the amplifier of a hearing aid device.

One feature of this invention is that it provides a new and improved method and apparatus for testing the hearing of a hard-of-hearing person at various frequencies; another feature is that the test conditions in the laboratory or other test location much more nearly than heretofore reproduce the hearing conditions which the hard-of-hearing person encounters in every day life; a further feature of this invention is that the testing apparatus provides direct determination of the intensities of sounds produced, without the necessity of additional meters or the like; other features and advantages of this invention will be apparent from the following specification and the drawings, in which:

Figure 1 is a circuit diagram of a simple test apparatus embodying my invention; Figure 2 is a chart illustrative of the operation thereof; and Figure 3 is a schematic diagram of a modified form of my invention.

It is known that the hearing response of the ear of a hard-of-hearing person differs for pure notes of various frequencies, and some effort has heretofore been made to design the amplifier of a hearing aid device to have a frequency-amplification curve inverse to the frequency-response curve of the ear. That is, the amplifier is designed to accentuate those frequencies to which the ear is least responsive and to amplify to a lesser extent those frequencies to which the ear is particularly responsive. A hearing aid device having an amplifier of this type has been disclosed in my earlier co-pending application, Serial No. 129,514, filed March 6, 1937.

Heretofore, however, audiometers or test apparatus used to determine the frequency response curve of the ear of a hard-of-hearing person have all been capable of determining only the threshold curve or the pain curve. That is, such previously used test apparatus has had means for producing notes of any desired frequency in the audio range and means for varying the intensity of such notes, generally combined with a meter or the like for measuring such intensity. With such apparatus, at any given fequency, the lowest (threshold) intensity audible to the person could be determined and the intensity which produced pain or discomfort. This enabled plotting of the two curves representing the extremes of hearing response; but gave no information as to the intermediate area bounded by such curves.

The threshold and pain curves seldom, if ever, have the same form; and I have found that hearing response at intermediate points may differ from the shape of both curves. In the normal affairs of every day life it is the intermediate area, and not the threshold curve, which is important. That is, the ears of a person are practically always exposed to a background of sound comprising practically all frequencies; and sounds which it is desired to hear must make themselves audible above such background. A person sitting in an office in the business area of a city, for example, will have his ears exposed to a background of noise produced by street cars, trains, motor traffic, typewriters, telephone conversations at other desks, and a number of other sources. Under such circumstances the threshold audibility curve determined in a laboratory under sound insulated conditions is of little value in designing a hearing aid device.

My invention comprises a method and apparatus for testing hearing in the intermediate area corresponding to normal usage, and comprises means for producing a background sound having a substantially uniform frequency distribution and a test sound, as a note of substantially a single frequency, with means for successively varying the frequency of the test sound and for determining at each such frequency the intensity necessary to render the note audible above the background sound. I then design the frequency-amplification curve of the amplifier of my hearing aid device inversely to the curve thus determined, ignoring the threshold curve.

In the particular embodiment of my invention illustrated herewith in Figure 1, a buzzer 10 driven by a battery 11 or similar source of power, is adapted to produce an electrical current comprised of practically all frequencies, the distribution of frequencies being substantially uniform through the audio range. That is, the buzzer is adapted to produce substantially all frequencies in the audio range simultaneously and at uniform intensity. While some buzzers tend to accentuate a certain frequency or portion of the frequency range, a buzzer can be chosen which does not do this; or this particular portion of the frequency range can be flattened down to the same level as the others by conventional filter means. Such means would form no part of the present invention, and are therefore not illustrated here.

The current produced by the buzzer is here shown as being applied to a resistor 12 as a load, the voltage developed across such resistor being amplified by the tube 13 and delivered to the primary of a transformer 14. The secondary of the transformer 14 delivers current to a circuit including a T pad, here identified in general as 15, said pad or resistance network working into the upper half of the primary of transformer 16.

The pad 15 or resistance network comprises three variable resistors 17, 18 and 19 connected as shown. The controls of these three variable resistors are ganged on a single shaft and so arranged that any change in the resistor 19 causes a similar but opposite change in the resistors 17 and 18. That is, at a given setting all three resistors might have a value of 500 ohms; and if the control knob were turned to reduce the value of resistor 19 to 300 ohms the other two resistors 17 and 18 would be simultaneously increased to 700 ohms each. Thus the impedances into which the two transformers 14 and 16 look is always maintained the same, even though the amount of current delivered to the transformer 16 can be varied to any desired intensity. The current producing means 10 and the amplifying tube 13 should, of course, be so designed and operated that the intensity of their output is constant; the intensity of current reaching the upper half of the transformer 16 will then always be a direct function of the setting of the control knob of the T pad 15 and this control knob may be calibrated to furnish a direct indication of intensity as well as a control therefor.

The lower part of the figure shows means for producing a note of any desired frequency in the audio range. For example, it is here shown as comprising a variable audio oscillator 20 of any conventional type, not further illustrated here; a resistor 21 as a load for such oscillator and an amplifying tube 22. As described in connection with the upper half of Figure 1, the output of the tube 22 is delivered through a transformer 23 to a circuit network including a calibrated variable T pad or resistance network 24 which in turn is connected to the lower half of the primary of transformer 16. The background sound furnished by the upper half of the apparatus and the note of any desired frequency produced by the lower half are thus mixed in the transformer 16. The resultant current in the secondary of such transformer 16 is delivered to a translating device such as an earphone 25, where the current is transformed into corresponding physical air or sound waves.

In using my method and apparatus to test the hearing of a person the audio oscillator 20 may be left inoperative and the intensity of the background sound varied to determine the threshold value (here indicated by the dotted line 30) and the beginning of the pain level (here indicated by the dotted line 31); and, if desired, the source of background sound may be rendered inoperative and the pure note source used, at various frequencies and intensities, to determine the threshold curve (here illustrated as 33). Inasmuch as the ear generally loses first its ability to distinguish high notes, the present illustrative chart shown in Figure 2 shows no response to frequencies above 6000 cycles per second without pain.

It will be noted that the two curves differ considerably in shape. Moreover, the useable hearing range between them varies considerably at different frequencies, being relatively small around 2000 cycles, for example, and relatively great around 3000 cycles.

By taking full advantage of my testing method and apparatus, however, the area lying between these curves 32 and 33 may be explored. The intensity of the background sound may be set at a good average level here indicated by the dotted line 34, which level may be chosen after consideration of the threshold and pain curves. The audio oscillator may then be run through the frequency range, the control for pad 24 being varied at each test frequency to determine the minimum intensity audible above the background sound. It is understood that during this testing the control of the resistance network 15 would be left in a fixed position, and that of the network 24 varied at each new frequency to which the audio oscillator 20 was changed. Notation of the various minimum audible intensities, read directly from the calibrations of the control of the resistance network 24, would give a hearing response curve which might be of the type here represented by the line 35.

This curve would represent the hearing response of the hard-of-hearing person to desired sounds under ordinary conditions when background sound was present. The frequency-amplification curve of the amplifying portion of the hearing aid device is then designed to be inverse to this curve 35. The result is a hearing aid device of much improved character, giving the desired apparent flat response to sound desired to be heard by the user.

Another form of apparatus embodying my invention is shown in Figure 3. In this modification the background sound is supplied by a current generated by an oscillator 40. This sound is passed through a T-pad impedance network 41 similar to those described in connection with Figure 1, and impressed across half of a transformer 42. This transformer serves to combine with the background sound a test sound generated in the audiometer 43. This audiometer, for example, may consist of the lower half of the circuit illustrated in Figure 1, adapted to provide a note of substantially a single frequency, although variable both as to frequency and intensity. The resultant combined currents are supplied by the secondary of the transformer 42 to the earphone or similar translating mechanism 44, where they are transformed into physical sound waves.

In this particular form of the invention the background sound, as was stated above, is created by an oscillator of conventional type, wherein an electronic tube is set into oscillation by feeding part of the plate energy to the grid circuit thereof, and the frequency of oscillation is controlled by a tuned circuit. Such a tuned circuit, as is usual, may include two impedances as a coil of fixed inductance and a variable condenser, here shown as 45. In practice, this condenser is of the usual type with interleaved rotor and stator plates, except that no stop is provided and the rotor plates can be revolved continuously by rotation of the condenser shaft 46. Such rotation, of course, continuously varies the frequency of the electrical wave generated by the oscillator.

The maximum and minimum values of the condenser should be so chosen, in relation to the inductance associated with it, that substantially the entire range of audible frequencies is covered by rotation of the condenser. Means is provided for continuously rotating the condenser at such a speed that there is no appreciable effect or tremolo on the ear of the hearer. This results in producing a background sound which covers substantially the entire range of audible frequencies. The means for continuously varying the condenser is here shown as a motor 47 which drives a pulley 48 on the shaft 46 of the variable condenser through a belt or similar means 49.

The above described form of my invention is used to test hearing in substantially the same way as that heretofore described in connection with Figures 1 and 2. It differs principally in that it has a positive and controlled means insuring generation of a background sound covering substantially the entire audible range, rather than merely depending on the action of a buzzer.

I also find that varying the intensity of the background sound at different frequencies is useful in testing an ear to determine the optimum design for a hearing aid amplifier. In order to do this the connection between the oscillator 40 and the T-pad 41, for example, can be broken and a tone and intensity controlled amplifier 50 may be inserted. Such an amplifier should incorporate means for varying the frequency-intensity characteristic curve throughout the audible range; and may, for example, be an amplifier such as is disclosed in my copending application, Serial No. 129,514, filed March 6, 1937.

When such a control amplifier is inserted between the oscillator and the T-pad, the background sound can be made to assume any desired frequency-intensity characteristic curve. For example, it could be made to conform to the threshold hearing curve 32 in Figure 2, rather than being a background of the same intensity at all frequencies. Under such circumstances the background sound can be arranged to be a given intensity above threshold at all frequencies.

While I have described and claimed certain embodiments of my invention it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible in view of the prior art.

I claim:

1. The method of testing hearing, comprising producing a background sound which, in its effect on the ear, apparently covers substantially the entire range of audible frequencies simultaneously, producing a test sound, applying said background sound and said test sound to the ear being tested, and determining the intensity of the test sound necessary to make it audible above the background sound.

2. The method of testing hearing, comprising producing a background sound having, in its effect on the ear, an apparently simultaneous substantially uniform frequency distribution, setting the intensity of said sound at a desired level, producing a note of substantially a single frequency, applying said background sound and said note to the ear being tested, determining the intensity of said note necessary to make the same audible above the background sound, and successively producing notes of other frequencies and determining the intensity necessary to make each audible.

3. The method of making a laboratory test of hearing to enable proper design of the frequency-amplification curve of the amplifier of a hearing aid device, comprising producing a background sound having, in its effect on the ear, an apparently simultaneous substantially uniform frequency distribution and a desired intensity, delivering the same to the ear being tested, successively producing and delivering to the same ear a plurality of notes each comprising substantially only a single frequency, and determining the minimum intensity of each such note necessary to make the same audible above the background sound.

4. Apparatus of the character described for testing hearing, including: means for producing an electrical current comprising, in its ultimate effect on the ear, a simultaneous substantially uniform distribution of audio frequencies; means for varying the intensity of said current; means for producing a second current of substantially a single frequency; means for varying the intensity of said second current; means for combining said currents; and means for translating said combined currents into corresponding physical sound waves.

5. Apparatus of the character claimed in claim 4, wherein said second current producing means is adapted to produce a current of any desired frequency in the audio range.

6. Apparatus of the character claimed in claim 4, wherein said intensity varying means are calibrated to enable direct determination of intensities therefrom.

7. Apparatus of the character described for testing hearing, including: means for producing an electric current comprising, in its ultimate effect on an ear, a simultaneous substantially uniform distribution of audio frequencies; a calibrated variable impedance in the form of a T network for simultaneously varying and determining the intensity of said current; means for producing a second current of substantially a single frequency; a calibrated variable impedance in the form of a T network for simultaneously varying and determining the intensity of the second current; and means for combining the currents and translating the combined currents into corresponding physical sound waves.

ARTHUR M. WENGEL.